UNITED STATES PATENT OFFICE.

JAMES LAWRENCE, OF PAULSBOROUGH, NEW JERSEY.

PROCESS OF RECOVERING NITRO-GLYCERINE FROM WASTE ACIDS.

SPECIFICATION forming part of Letters Patent No. 482,372, dated September 13, 1892.

Application filed April 13, 1892. Serial No. 429,049. (No specimens.)

*To all whom it may concern:*

Be it known that I, JAMES LAWRENCE, a citizen of the United States, residing at Paulsborough, county of Gloucester, and State of New Jersey, have invented a new and useful Improvement in Processes for the Extraction of Nitro-Glycerine from the Waste Acids Formed in the Manufacture of Nitro-Glycerine, of which the following is a full, clear, and exact description.

In the process of manufacturing nitro-glycerine the glycerine is mixed with nitric and sulphuric acid, whereby there is formed nitroglycerine. The nitro-glycerine formed is then separated from the waste acids, and this may be accomplished in several well-known ways, one of which is to allow the acid to pass out the bottom of the tank or vessel until practically all of said acid is removed, leaving the nitro-glycerine in the tank for subsequent treatment in the ordinary manner. It has been well known that this waste acid, which is carried away from the nitro-glycerine tank, contains a certain amount of glycerine which has not been acted upon by the nitric acid in the said tank, and also a certain amount of nitric acid. Prior to my discovery the waste acid was treated only for the recovery of the acids. I have discovered that by cooling this waste acid to a certain temperature a reaction takes place between the glycerine and the nitric acid in the waste acid, whereby there is produced from the waste acids a certain amount of nitro-glycerine, dependent upon the amount of nitric acid and glycerine therein. I carry out this process preferably in the following manner: The waste acids from the nitro-glycerine vat are run into a lead tank having a lead pipe-coil inside, through which cold water is drawn by means of a small pump driven by compressed air or steam. The tank is protected on the outside with a jacket of mineral wool cased in wood and has a lid of wood dipped in hot paraffine-wax. The temperature of the entering acid is usually from 50° to 65° Fahrenheit. The temperature of the cooling agent should be as low or lower than the freezing-point of nitro-glycerine and higher than the freezing-point of the acids. Nitro-glycerine freezes or solidifies at or about 45° Fahrenheit, while the waste acid freezes at or about 35°, so that the temperature to which I reduce this mixture of glycerine and waste acids is between 35° and 45° Fahrenheit, preferably between 39° and 41°, as this has given the best results. By this treatment of the waste acids I have discovered that the nitric acid in the waste acids becomes active, combining with the glycerine, forming nitroglycerine, which rises to the surface and can be removed. This refrigeration should be continued for a considerable period with occasional agitation, as the process is slow. I have found in practice that from three to four days are necessary to carry the operation to full success, although if the product desired be less or the percentage recovered be less of course the time may be proportionately reduced. Each day the nitro-glycerine collected on the surface is taken out and placed in a wooden tank containing water at 65° Fahrenheit, from which it is drawn off to be treated with alkaline solution in the ordinary manner. By my process for a given quantity of glycerine I can increase the ultimate yield from six to nine per cent. If desired, sulphuric acid may be added to the waste acid before or during the cooling of the waste acid, as the yield of nitro-glycerine may be increased thereby.

The above is the preferred method of carrying out my process; but the process may be carried out in any suitable vessel surrounded by ice water, and the acids may be stirred by means of paddles driven by hand or by power. Again, a refrigerating-machine may be used to cool the acids; but in all cases care should be taken that the acids are not cooled to the freezing-point. As a rule they should be cooled to within 4° of their freezing-point and about 5° Fahrenheit below the freezing-point of nitro-glycerine.

Having now fully described my invention, what I claim, and desire to protect by Letters Patent, is—

1. In the manufacture of nitro-glycerine, the improvement which consists in, first, nitration of the glycerine; second, separation of the nitro-glycerine formed from the waste acids; third, cooling the waste acids to a temperature below the freezing-point of nitro-glycerine and above the freezing-point of the acids.

2. In the manufacture of nitro-glycerine, the improvement which consists in, first, nitration of the glycerine; second, separation of the nitro-glycerine formed from the waste acids; third, cooling the waste acids to a temperature below the freezing-point of nitro-glycerine and above the freezing-point of the acids and agitating said acids during said cooling.

3. In the manufacture of nitro-glycerine, the improvement which consists in, first, nitration of the glycerine; second, separation of the nitro-glycerine formed from the waste acids; third, adding surphuric acid to the waste acids and cooling the same to a temperature below the freezing-point of nitro-glycerine and above the freezing-point of the acids.

4. In the manufacture of nitro-glycerine, the improvement which consists in, first, nitration of the glycerine; second, separation of the nitro-glycerine formed from the waste acids; third, cooling the waste acids to a temperature below the freezing-point of nitro-glycerine and above the freezing-point of the acids and removing the nitro-glycerine produced from the waste acids from the remaining part of the spent acids.

In testimony of which invention I have hereunto set my hand.

JAMES LAWRENCE.

Witnesses:
GEO. W. REED,
FRANK S. BUSSER.